United States Patent Office 3,475,063
Patented Oct. 28, 1969

3,475,063
LOW FRICTION BEARING AND SUPPORT ARRANGEMENT
Lennart Arvid Stenström, Huddinge, Sweden, assignor to U.S. Philips Corporation, New York, N.Y., a corporation of Delaware
Filed Feb. 13, 1967, Ser. No. 615,652
Claims priority, application Sweden, Feb. 11, 1966, 1,798/66
Int. Cl. F16c 9/00, 7/00, 11/00
U.S. Cl. 308—2          4 Claims

ABSTRACT OF THE DISCLOSURE

A relatively frictionless bearing arrangement for rotatably supporting a body between a plurality of cylindrical bearing elements suspended by bands which are wound around the cylindrical surfaces of the elements and attached to a fixed portion of a supporting structure.

---

Figures 1, 1A:
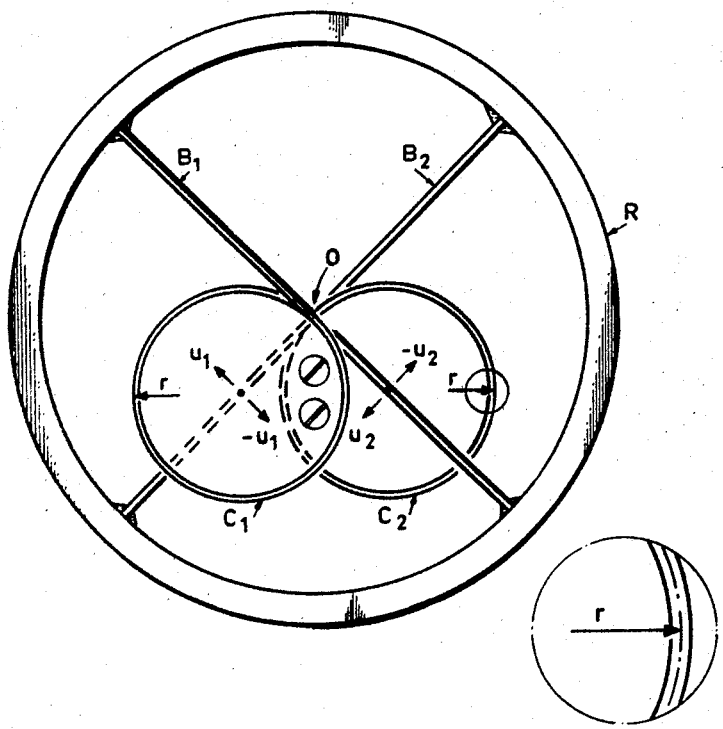

The present invention relates to a bearing device which is especially but not exclusively suitable for inertial instruments, such as inertial navigation systems, vertical indicators etc. The accuracy of inertial navigation systems depends upon the properties of its platform instruments, for example gyroscopes, accelerometers, Schuler-tuned pendulums etc. and with these components the problem which exists is to achieve a frictionless bearing support. The same is valid for similar instruments, as seismographs, lever balances and gravimeters. All these instruments have a body, which is movable in one or more degrees of freedom, preferably without disturbing torques due to friction or elastic reaction. However, it is often sufficient if the freedom from friction and other disturbing torques is fulfilled for very small angular movements, as with the Schuler-tuned pendulums (some minutes) or in other applications a maximum angular deflection of some degrees.

At the Schuler-tuned pendulum there arises special bearing problems, such as those due to the fact that the supported mass is large as compared with the allowed disturbance torque and that the pendulum should maintain its accuracy under accelerations and vibrations. This is similarly valid for gimbal bearing in gyroscopes.

The bearing problems in inertial navigations systems have hitherto been solved mainly in two different ways, namely by elastic bearings (resilient support) and float bearings (fluid support). The elastic bearings is used in certain accelerometers and Schuler-tuned pendulums but has appeared to give rise to acceptable disturbance torques only when the supported mass is small in comparison with the pendulum balance. The float support is used in gyroscopes but is expensive and gives rise to damping which is disadvantageous in certain cases. The invention eliminates these drawbacks and produces a bearing which is practically free from both disturbance torques and damping and can be used for supporting relatively large masses.

Briefly the invention in its basic form consists of two sets of cylindrical bearing surfaces, each set consisting of a plurality of cylindrical elements fixedly connected to each other and held within a surrounding structure by tightly stretched substantially inelastic wires or bands. The bands are partly wound upon the intersecting cylindrical surfaces formed by the cylindrical elements and then rigidly connected at each end to opposite connections on the surrounding structure. The surrounding structure shown in the drawings as rings are fixedly attached to a base or foundation. A body to be supported is connected to these sets of bearing elements. A change in the position of the body with respect to the surrounding structure, will produce a change of the mutual position of the bearing elements and the bands will consequently be wound or unwound on the respective cylindrical bearing surfaces resulting in a rotational movement of the body about a longitudinal axis which axis is determined by the intersection point between the cylindrical bearing surfaces.

By using this band support-arrangement both friction and elastic reactions can be made small. The friction has two components: inherent friction (hysteresis) in the band and rolling friction in the region where the band and cylindrical surfaces come in contact with each other. The former can be maintained at a low level if the cylinder radius is made sufficiently large. The rolling friction between the band and cylinder is dominated by unevenness of the cylinder or the band or by impurities between the cylinder and band. Consequently the rolling friction can be made low if the cylindrical surfaces are shaped with an accurate and high polished surface. The bands which also should be made with high accuracy and have a high polished surface may possibly be made of a softer metal or have such a metal plated thereon so that disturbing impurities can more easily be pressed into the band material. The elastic reaction depends upon the fact that the bands are imparted with small transverse displacement when the body is rotated, which can be accounted for only if the bands are extended or if their connection joints are yielding. However, it has appeared that the elastic reaction is quite negligible for the small angular deflections which appear in for example a Schuler-tuned pendulum.

For a mathematical analysis of the elastic reaction and displacement of the band, attention is called to the attached diagram. In the diagram, references $A_1$ and $B_1$ are the normal positions for the center point of the two supporting cylindrical elements having radius $r$; $a$, $b$ are the supporting bands stretched to a tension $s$. When the system is rotated an angle $v$, center point $A_1$ will be displaced to $A_2$. It is observed that the band $a$ will be displaced transversely a distance $f$, which is caused by an extension of the band. This extension or elastic reaction and its size can be calculated as follows.

The displacement $f$ when angle $v$ is small, can be determined thusly:

$$(f)(2r) = (rv)^2$$

$$f = r\left(\frac{v^2}{2}\right)$$

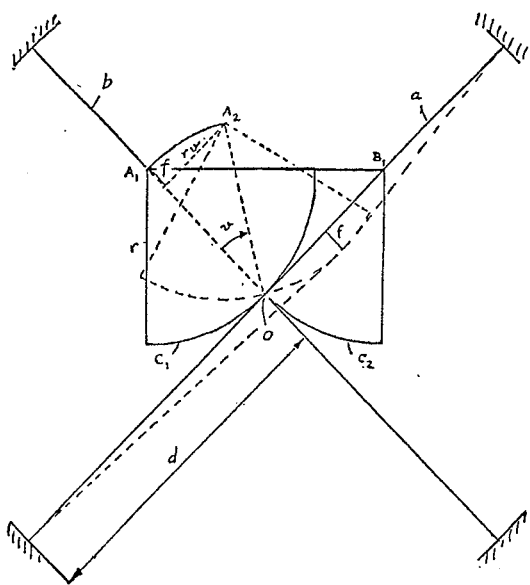

The force $(2f/d)$ $(s)$ acting with the lever arm $(r)$ $(v)$ results in a reaction torque $$\Delta M = (rv)\left(\frac{rv^2}{2}\right)\left(\frac{s}{d}\right) \quad (2)$$

$$\Delta M = (v^3)\left(\frac{r^2}{d}\right)(s)$$

Thus the reaction torque originating from the two branches of one strap, e.g. $a$, varies with the third power of the deflection angle $v$ and decreases rapidly to zero when $v$ approaches zero.

Example

With $r=0.5$ cm., $d=1.5$ cm., $s=1000$ $p$ and an allowable torque of 0.01 pcm per strap the allowable rotation angle will be $$v = \sqrt[3]{\frac{\Delta M d}{r^2 s}} = \sqrt[3]{\frac{0.01 \cdot 1.5}{0.5^2 \cdot 1000}}$$

$v = 0.04$ rad or $2.3°$

This angle is one or two orders of magnitude greater than required in an advanced application and the elastic reaction due to transversal displacement of the straps is negligible.

At the said angle the displacement $f$ will be $$f = (0.5)\left(\frac{0.04^2}{2}\right)10,000 \ \mu m$$

$f = 4 \ \mu m$

This will give rise to a tension increase in the strap. If the length of the same is increased from $d$ to $d+\epsilon d$ one obtains, according to Pythagoras' law $$(d + \epsilon d)^2 - d^2 = f^2$$

$$2\epsilon d^2 = f^2$$

$$\epsilon = \frac{f^2}{2d^2} = \frac{16 \times 10^{-6}}{2 \times 225}$$

If the coefficient of elasticity of the strap is $10^4$ kg./mm.$^2$ the additional tension will be $$\delta = \epsilon E = \left(\frac{8}{2.25}\right)(10^{-4}) = 4 \times 10^{-4} \text{ kg./mm.}^2$$

which is quite negligible in the dimensioning of the strap.

Figure 2:
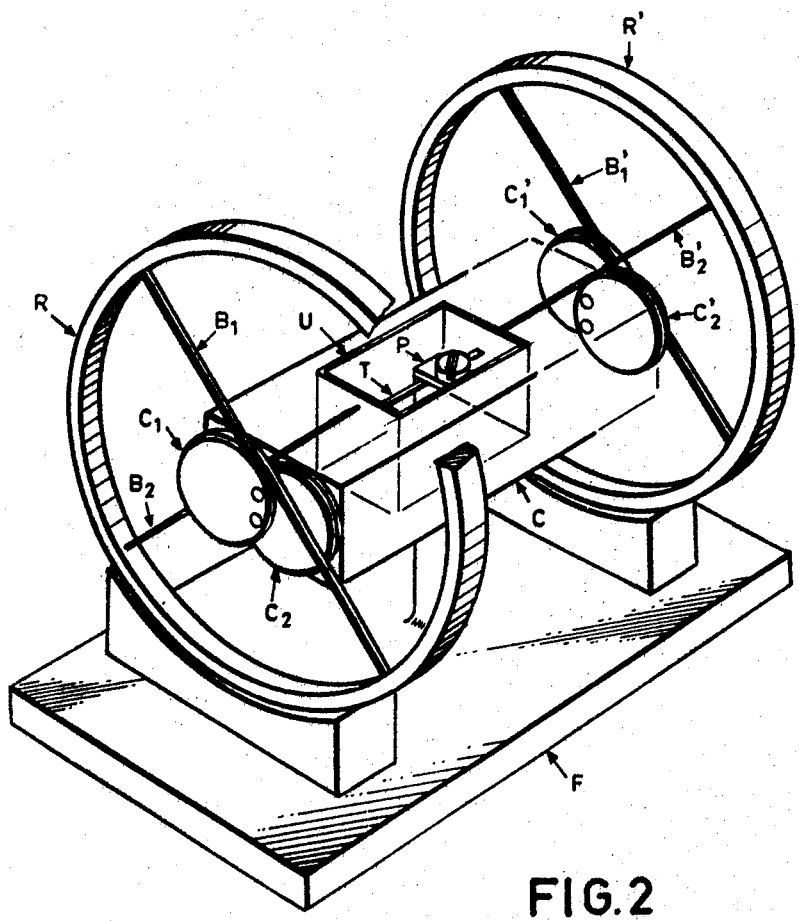
Figure 3:
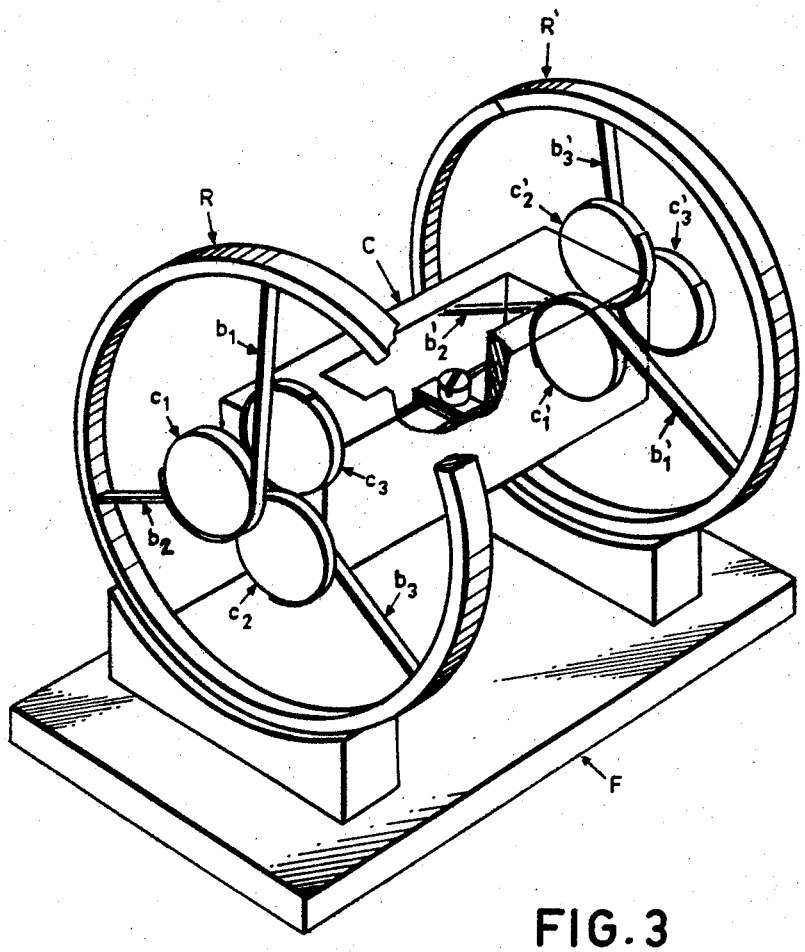

The invention is illustrated by means of example in the accompanying drawings in which FIGS. 1 and 1$a$ show a side view of a bearing according to the invention, FIG. 2 shows a perspective view of a device with two bearings according to FIG. 1 and FIG. 3 shows a perspective view of a bearing device with bearings of an alternative construction.

In FIG. 1 reference R designates the fix portion of the bearing (analogous to the outer ring in a ball bearing). Its movable portion has the shape of two short cylinders $C_1$ and $C_2$. The radius $r$ designates the radius of the cylinders with half the thickness of the band added thereto. The centrum distance of the cylinders is suitably equal to $r\sqrt{2}$. The cylinders are connected to the ring R through thin bands $B_1$ and $B_2$. The band $B_1$ is wound one turn around the cylinder $C_1$ and the band $B_2$ is wound around the cylinder $C_2$. The cylinders are rigidly connected to each other as indicated upon the drawing by screws and form together a solid body. The cylinder $C_1$ can be moved by rolling along the band $B_1$ so that its center point is displaced in direction $u_1$ or $-u_1$ parallel to the band $B_1$. The cylinder $C_2$ can in a similar way be moved in direction $u_2$ or $-u_2$ parallel to the band $B_2$. However, as the cylinders $C_1$ and $C_2$ are rigidly connected to each other, the displacements $u_1$ and $u_2$ refer to one and the same body and the said movements can therefore be effected only by a rotation of this body about the intersection point 0 between the peripheries of the cylindrical surfaces defined by radius $r$. For supporting a body connected to $C_1$—$C_2$ there is required two units of the shown bearing, which allow rotation about axis 0 only. The device will allow a certain translation movement perpendicular to the plane of the paper and must therefore if such movement is to be prevented be combined with a device, for example band in the axis direction which prevents this degree of freedom.

It is essential that the cylindrical surfaces, where winding-off and winding-on occurs, are parallel to each other and to the rotation axis. The cylinders may possibly be adjustable to make possible a parallel adjustment of the surfaces.

In FIG. 2 it is shown how a body C can be rotatably supported in a fundament F by means of two bearings of the described construction. The body C is fixedly and rigidly connected to the said cylinders $C_1$, $C_2$ and $C'_1$, $C'_2$ respectively, while the rings R and R' are connected to the fundament F. Axial holding is produced by a band or a wire T which coincides with the rotation axis and is fixed to the walls of a recess U in the body. The wire is clamped to a pillar P projecting from the fundament and will hereby hold the body in axial direction, while it will allow rotation about the rotation axis.

In FIG. 3 there is shown a bearing device similar to that of FIG. 2 but with an alternative embodiment of the bearings. Corresponding components in FIG. 3 provided with the same references as in FIG. 2.

The movable portion of the bearing is according to FIG. 3 formed by three cylinders $c_1$, $c_2$, $c_3$ and $c'_1$, $c'_2$, $c'_3$ respectively on which the three bands $b_1$, $b_2$, $b_3$ and $b'_1$, $b'_2$, $b'_3$ respectively are partly wound. The bands have one of their ends fixed to the respective cylinder and the other end fixed in the unmovable portion, i.e. the ring R and R' respectively.

The cylinders are arranged such that the tangents to the cylindrical surfaces at the intersection point form 120° angles with each other, and the points where the bands are fixed in the outer ring are also displaced 120° relative to each other. In this embodiment winding-off will take place simultaneously from all three cylinders in one and the same bearing at rotation in one direction and winding-on on all cylinders at rotation in opposite direction. In order to ensure that it always will be totally the same number of bands which are wound and on or off, the bands and cylinders are then arranged such that winding-off takes place at one of the bearings when winding-on occurs at the opposite bearing and vice versa.

Holding of the body C in axial direction can be effected in a similar way as in the previously described embodiment.

An advantage for the three point support is that all three bands in one bearing can be individually stretched tightly by means of an adjusting screw.

The band shaped bearings are as mentioned, only suitable for very small mutual angular movements of the two bearing portions. Since only a very small portion of the cylindrical envelope surfaces are utilized it is not necessary to have whole cylinders and small sections of cylindrical surfaces can be used. The cylindrical surfaces may be manufactured by turning small portions of a shaft which is used for supporting the movable body.

The body C connected to the cylinders can in both examples be made stationary and the rings R, R' with the attached bearing surfaces connected thereto and then being movable relative to C. Such an arrangement can in certain cases be advantageous in that it gives an alternative as regards the dimensions and shape of the movable portion, for example the Schuler-pendulum in inertial navigation systems.

What is claimed is:

1. A low friction bearing arrangement for rotatably suspending a body comprising a surrounding structure, plural sets of spaced apart cylindrical shaped bearing elements positioned within the said structure, said cylindrical shaped bearing elements being laterally displaced but having overlapping portions, and supporting bands wound around the said bearing elements with at least one end of each band secured to the said structure, the sets of bearing elements defining therebetween an axis, about which the body rotates.

2. The apparatus of claim 1 further characterized in that each set of bearing elements has two cylindrical bearing surfaces, the elements being fixedly connected to each other in transverse juxtaposition and each element having separate supporting bands wound around the respective bearing surfaces.

3. The apparatus of claim 1 further characterized in that each set of bearing elements has three cylindrical bearing surfaces and the supporting bands are radially spaced and connected to the surrounding structure at points spaced 120° apart around the perimeter of the surrounding structure.

4. The apparatus of claim 3 further characterized in that the three bands are wound in a clockwise direction on one set of bearing surfaces and a counterclockwise direction on the other set of bearing surfaces so that upon rotation the bands will be further wound upon one set of surfaces and, at the same time, unwound from the opposite set of surfaces.

References Cited

UNITED STATES PATENTS

| 2,674,502 | 4/1954 | Faxén | 308—2 |
| 1,702,455 | 2/1929 | Trumpler | 308—2 |
| 1,835,349 | 12/1931 | Smith | 192—8 |

FOREIGN PATENTS

| 1,448,354 | 6/1966 | France. |
| 1,123,734 | 9/1956 | France. |
| 1,448,354 | 6/1966 | France. |
| 526,230 | 6/1931 | Germany. |
| 426,295 | 6/1967 | Switzerland. |

MARTIN P. SCHWADRON, Primary Examiner

L. L. JOHNSON, Assistant Examiner